United States Patent [19]

Molina Bonillo

[11] 4,391,577

[45] Jul. 5, 1983

[54] INSTALLATIONS FOR THE HANDLING OF MOLDS ASSOCIATED WITH A TRANSFER PRESS

[75] Inventor: Juan J. Molina Bonillo, Barcelona, Spain

[73] Assignee: G. Siempelkamp GmbH & Co., Krefeld, Fed. Rep. of Germany

[21] Appl. No.: 347,036

[22] Filed: Feb. 8, 1982

[30] Foreign Application Priority Data

Feb. 10, 1981 [ES] Spain .................................... 499.281

[51] Int. Cl.3 .................................... B29C 3/00

[52] U.S. Cl. .................................... 425/338

[58] Field of Search .................... 425/338, 339, 340

[56] References Cited

U.S. PATENT DOCUMENTS

| | | | |
|---|---|---|---|
| 1,291,637 | 1/1919 | Burkhardt | 425/338 |
| 1,332,457 | 2/1920 | Burkhardt | 425/338 |
| 1,800,849 | 4/1931 | Stacy | 425/338 |
| 2,264,125 | 11/1941 | Wolf et al. | 425/338 X |
| 2,543,582 | 2/1951 | Lgipgnen | 425/339 X |
| 2,831,213 | 4/1958 | Klasmann et al. | 425/339 |
| 3,170,189 | 2/1965 | Hütter | 425/339 |
| 3,206,800 | 9/1965 | Müller | 425/339 X |
| 3,237,246 | 3/1966 | Carlsson | 425/338 |
| 3,242,532 | 3/1966 | Borah | 425/338 |
| 3,286,304 | 11/1966 | Falkinger | 425/339 X |
| 3,368,242 | 2/1968 | Loeivenfeld et al. | 425/339 X |
| 3,379,322 | 4/1968 | Bruder et al. | 425/338 X |
| 3,389,652 | 6/1968 | Bruder et al. | 425/338 X |
| 3,860,381 | 1/1975 | Pesch | 425/338 |

*Primary Examiner*—J. Howard Flint, Jr.

*Attorney, Agent, or Firm*—Karl F. Ross; Herbert Dubno

[57] ABSTRACT

This invention relates to improvements of installations for the handling of molds associated with a transfer type press.

This installation is characterized in that at each level of the transfer type press (1) and on either side of the latter, there are displacement and guiding (*4a, 4b, 4c, 4d*) channels for molds (2,3) which are removed from the press (1) for the stripping and loading operations at different distances from that press, which leads to a sufficient separation between the molds.

This is applicable to the curing of flat objects.

8 Claims, 2 Drawing Figures

INSTALLATIONS FOR THE HANDLING OF MOLDS ASSOCIATED WITH A TRANSFER PRESS

This invention relates to improvements of installations for the handling of molds associated with a transfer type press.

Presses of this type are used to simultaneously cure, under the effect of heat and pressure, various objects having an essentially planar configuration using corresponding superimposed molds in said press. The loading and unloading operations of these molds and the corresponding operations involving the introduction of the molds into the press once they are loaded and the removal of said molds from that press after the curing period, for the purpose of stripping, lead to very troublesome and fastidious work which is carried out under the most difficult conditions of high temperature. If the handling of the molds is carried out manually, the operator has to handle the molds and their covers or counterparts, which are particularly heavy, in the immediate vicinity of the hot press, the operator being constantly in danger of suffering burns due both to the mold components which he is handling and to the other molds of the assembly introduced into the transfer type press.

Installations are already known in the art for the joint handling of different molds and which provide for the stripping of a set of these molds while another set is inside the press in a curing operation. These installations consist of two vertical solid axes located on either side of the press on which are hinged, at different levels, the various molds comprising the two sets. Such installations make it possible to substantially reduce production times as a result of the fact that a set of molds is being cured while the other set is being stripped, but they do not, however, decrease the danger of burns because the stripping operations occur at a place located near the other molds of the set and obviously near the press which is in a working mode.

It is possible to correct these drawbacks by applying the improvements according to the invention which consist in providing sliding channels for the molds at each level of the transfer type press and on either side of the latter, these sliding channels being used to remove the previously mentioned molds from the press for the purpose of carrying out the stripping and loading operations while maintaining a safe distance between each pair of neighbouring molds and between the first mold and the press. This particular arrangement makes it possible to eliminate any danger of burns.

Another characteristic of the invention resides in the fact that when the set of molds leaving the press is in a stripping and loading position, the other set of molds is housed inside the press so that the curing operation takes place. As a result, the work obtained from the press is practically continuous and the press has to be interrupted only when the molds are changed, a set of molds being removed from the press while the molds of the other set are introduced through the open side.

An essential characteristic of the invention is that the molds of each set occupying the same level are subjected to a synchronized translational motion and are connected directly to one another through a rigid anchor which permanently maintains the distance between them. Another characteristic is that a given pair of molds located at the same level moves at a speed which is different from that of the other pairs of molds located at the other levels, which leads to the important consequence characterized by the fact that when the molds of a set are superimposed inside the press, the molds of the other set are located at different distances from the press, with separations between them that are sufficient to carry out the stripping and loading operations for each mold with the greatest of ease.

Another characteristic of the invention constitutes an improvement which makes it possible for the mold opening operation (simultaneous for all molds of a set) to be mechanized before the stripping and loading operation of these molds. On the upper part of the installation, there is a rotating shaft which, as a result of its rotation, induces the winding of various cables (at the rate of one per mold) which end in hooks cooperating with rings provided on the opening edges of the counterparts or covers which are jointed by hinges onto the respective molds. These hooks are engaged in the rings to open the molds which have been removed from the press and they become disengaged when these molds are just about to enter the press.

The application of the improvements as a whole according to the invention gives rise to an installation associated with a transfer type press which makes it possible for a single operator to conveniently carry out the entire operation of two mold assemblies automatically engaged in the press, each of these assmblies comprising, possibly, up to six large molds (or even twelve molds) in which are cured objects such as bibs, mud pickups for truckwheels, carpeting for automobiles and for scrapers, coverings and other similar linings.

It is evident that a control desk is located in an appropriate place with appropriate push-buttons so that the operator can control all movements which require the total manipulation of the molds in coordination with the operation of the press. This entire operation can also be automated by means of a corresponding synchronisation device which leaves the operator with the simple task consisting in separating the molded objects from the molds and in loading these molds with masses of material to be cured.

A mode of application of this invention is described below, as a non-limiting example with reference to the appended drawing in which.

Figure 1:
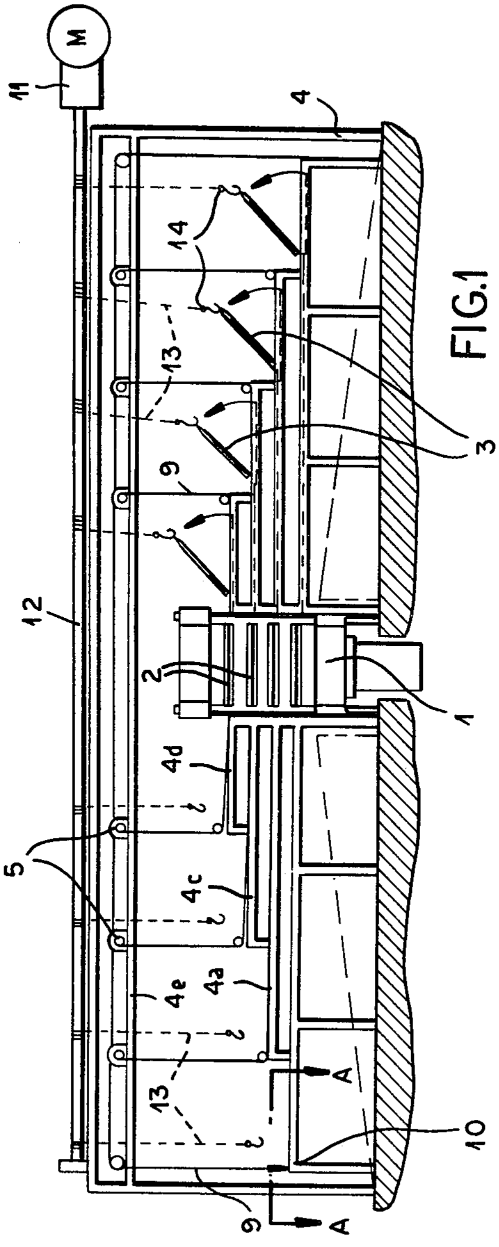
FIG. 1 is a diagrammatic elevational view of an installation according to the invention designed for the handling of the molds.
Figure 2:
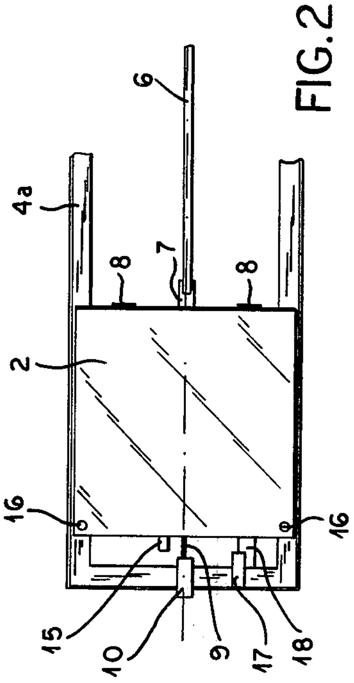
FIG. 2 is a plan view, to a larger scale, along line A—A of FIG. 1.

In the drawing, FIG. 1 shows at its center, the transfer type press 1 shown in the curing phase applied to a set of planar molds 2 corresponding to the left part of the installation and housed at different levels inside the press. At the same time, the other set of molds 3 corresponding to the right part of the installation are open and occupy cascade staggered positions which remarkably enhance the stripping of the manufactured parts and the new loading with unworked material.

Press 1 is located at the center of a metallic frame 4 which has, at its lower part and on either side of press 1, as many guides located at different levels as the number of molds 2,3 included in each set. In the example shown, there are four levels 4*a*, 4*b*, 4*c*, 4*d* due to the fact that there are four molds in each set and these guides have different lengths starting from the press, this length decreasing progressively in order to provide for the placement of the mold according to cascade staggered positions thus facilitating their opening (see right side of FIG. 1). At the upper part of frame 4, there is a beam 4*e* which supports a reduction gear assembly 5 controlling the translations of the molds.

In the example shown in FIG. 1, each mold 3 located at a given level is mechanically connected to mold 3 of the same level through a rigid anchor 6 the extremities of which are hinged onto these two molds at a central point 7 located between opening hinges 8. On the opening side, mold 2 is hooked onto a traction cable 9 which passes below a pulley 10 which extends vertically and passes on the corresponding gear reduction pulley 5 on which it is wound or alternately, according to a varying embodiment from which it extends up to the reduction gear pulley which is associated with mold 3 of the other series located at the same level. In this way, when reduction gear 5, corresponding to the mold which is to leave the press, is actuated, the mold of the other set is similarly driven and when the latter arrives into position inside the press, the first mold has arrived at the opening position. If the reduction gears have the same exit velocity, it is possible to provide conditions such that, by varying in an appropriate manner, the diameter of their driving pulleys, each pair of molds located at a same level moves, in an equal period of time, over a different distance and such that, by starting from a position from which all the molds are superimposed in the press, they move at different speeds and finally occupy the staggered stripping positions. These different speeds make it possible simultaneously for the molds of the other set to move starting at positions located at different distances and to finally be housed in superimposed positions inside the press. This makes it possible to control the entire operation by means of a single switch to which are simultaneously connected all the reduction gears 5 which exert a pulling action on the molds which are to leave press 1.

At the upper part of armature 4, there is also a reduction gear 11 which drives a longitudinal rotating shaft 12 which, by its rotation, winds the extreme upper parts of cables 13 by means of which the opening operation of the molds is controlled. For a given direction of rotation of shaft 12, the cables 13 associated with the molds of a set are wound whereas for the opposite direction of rotation, the cables associated with the molds of the other set are the ones that are wound. Since the reduction gear 11 is provided with an operation inversion system, it is possible to pull on the cables located on one side of the press while, on the contrary, slackening the cables located on the other side. Each cable 13 comprises a hook shaped extremity 14 which, at the time of opening, is engaged in a ring 15 integral with the mold cover and which is disengaged when the mold is moved towards the press. The movements of the rotating shaft 12 in one direction or the other are of course limited by any appropriate type of end of stroke contact.

In addition, for each mold 2,3, a pair of stops 16 has been provided which, at the end of the stroke of mold 2,3 are set against guides 4*a*, 4*b*, 4*c* and 4*d* and prevent the mold from accompanying the cover when the opening is effected.

For each pair of molds 2,3, located at the same level, an end of stroke device has been provided at one or the other extremity, which consists of a microswitch 17 integral with an elastic beam which is actuated by a cam 18 projecting from the mold. In this way, a braking action of the mold is effected before the microswitch 17 can open the electric circuit which feeds reduction gear 5 providing the pulling action on the mold.

I claim:

1. An apparatus for the handling of the molds of a transfer type press having a plurality of levels comprising channels flanking said press at each level thereof for guiding the displacement of said molds into and out of said press for the stripping and loading of said molds at different distances from said press, whereby the respective molds on any level are offset from the respective molds on any other level.

2. The apparatus defined in claim 1 wherein said molds are arranged in pairs at each level of said press and fixedly spaced apart from one another by a rigid connection therebetween joined midway between hinges provided for the opening of the respective mold cover, each of said mold pairs being subjected to synchronized translational displacement, whereby each mold of said mold pairs is alternately cured and stripped simultaneously on every level.

3. The apparatus defined in claim 2 wherein the respective molds of any mold pair are spaced apart from one another by a distance which is different from the distance between the respective molds of any other mold pair, a respective mold pair on any level being displaced at a speed different from the speed of the displacement of a respective mold pair on any other level, whereby when respective molds of said mold pairs are in registration in said press, the respective remaining molds of said mold pairs are positioned at different distances from said press for enabling the stripping and loading of the respective molds without their mutual interference.

4. The apparatus defined in claim 3 wherein said press is flanked by as many guide channels as there are molds, the respective guide channels on any level having a different length than the respective guide channels on any other level, the lengths of said guide channels increasing starting from the top of said press to the bottom thereof, enabling the molds which have left the press to be positioned in a staggered cascade arrangement, said press being further provided with a frame for supporting said guide channels.

5. The apparatus defined in claim 4, each of said levels further comprising:

- a respective idler provided at the extremity of each of said guide channels;
- a respective electric driving pulley mounted on said frame above each idler; and
- a respective first cable attached to each mold of the respective mold pair and passing around said respective idler into engagement with said respective driving pulley for the displacement of the respective mold into and out of said press.

6. The apparatus defined in claim 5 wherein each of said driving pulleys rotates at the same rate, each set of driving pulleys associated with the same level having the same diameter, said diameter being so chosen so as to displace the respective mold pair over the length of the respective level, a respective set of driving pulleys for any level having a diameter different from the diameter of the respective sets of the other levels.

7. The apparatus defined in claim 6, further comprising an elongated rotatable shaft mounted on said frame above said guide channels and in longitudinal alignment therewith, a plurality of second cables wound on said shaft on one side of said press and a plurality of third cables wound on said shaft on the other side of said press, said second and third cables being in alignment with a ring provided on the cover of the respective molds on that side of said press in the stripping and loading position of the molds, the ends of said second and third cables having hooked shaped extremities adapted to alternately engage said rings for opening the respective molds in the stripping and loading position and disengage said rings for closing the respective molds upon displacement thereof into said press, said second and third cables being wound on said shaft in opposite directions so that any rotation of said shaft will lower one set of cables and raise the other set, and a pair of stops provided at the end of each guide channel for engaging the respective mold thereof in the stripping and loading position, thereby preventing the lifting of the mold from the guide channel when the cover thereof is being opened.

8. The apparatus defined in claim 7, further comprising an elastically mounted microswitch provided at the end of each guide channel and act as a brake for the mold of the respective channel, said microswitch being activated by a cam on said mold for controlling the electric driving pulley associated with said mold.

* * * * *